Patented Jan. 7, 1936

2,027,264

UNITED STATES PATENT OFFICE 2,027,264

MANUFACTURE OF ACID CALCIUM CITRATE

Alexander Hutcheon Bennett, London, England

No Drawing. Application January 31, 1935, Serial No. 4,409. In Italy July 13, 1934

4 Claims. (Cl. 260—112)

This invention concerns the manufacture of acid calcium citrate $CaC_6H_6O_7$ (with one or with three molecules of water of crystallization) in which only two of the three acid groups in the molecule are neutralized by lime. For this purpose it has already been proposed to add to a cold solution of citric acid (lemon juice or other solution) about half the quantity of lime or of carbonate of lime necessary for its complete neutralization. The addition is made with continual stirring of the liquid and the lime goes entirely into solution. After some hours the liquid deposits a precipitate of the above-mentioned acid citrate which is filtered off, washed with cold water and used as the raw material for the manufacture of citric acid.

For this process any solution of citric acid containing 5 per cent or more of the acid can be employed.

It is evident that the quantity of lime added in this process is not sufficient to bring all the citric acid present to the state of the acid citrate, $CaC_6H_6O_7$. To do this it would be necessary to add two-thirds of the amount of lime required for the complete neutralization of the citric acid present. If however the lime is added in this proportion the precipitate formed is in great part or entirely the neutral citrate, $$Ca_3(C_6H_5O_7)_2.4H_2O.$$

The present invention seeks to improve the process of manufacture referred to above in a manner whereby a greater yield of acid citrate of calcium will be obtained and the formation of the neutral citrate $Ca_3(C_6H_5O_7)_2.4H_2O$ will be avoided.

Broadly considered the invention consists in precipitating the acid citrate in successive stages, the lime or carbonate of lime employed for the precipitation being introduced to the acid solution in successively diminishing quantities, the total of the lime or carbonate used amounting to about two-thirds of that required for the complete neutralization of the citric acid contained in the original solution. By this method of operation a larger yield of acid calcium citrate is obtained while the creation of the neutral citrate is almost or entirely avoided.

In a preferred way of carrying the invention into practical effect I add to the solution of citric acid about one half of the amount of lime (or preferably carbonate of lime) necessary for the complete neutralization of the citric acid present and stir the liquid until all the lime has gone into solution.

After some hours this brings about the precipitation of the acid citrate already described. When this precipitation has taken place I add to the liquid a further quantity of lime (or of carbonate of lime) sufficient to bring the total quantity added up to two-thirds of that necessary for the complete neutralization of the citric acid originally present.

For example, if the solution of citric acid to be treated contains so much acid as to require 3 kilograms of lime for its complete neutralization I add first 1½ kilograms, and after the formation of the precipitate of acid citrate, another ½-kilogram of lime.

In this way the quantity of the precipitate of acid citrate is greatly increased and it is possible to obtain from 80 to 90 per cent of the citric acid present in this form.

The operations are carried out "in the cold", that is at a temperature not exceeding about 20° C. At higher temperatures there is a tendency to the formation of neutral tricalcium citrate. The temperature at which this action becomes important varies according to the concentration in citric acid of the solution to be treated, more concentrated solution permitting higher temperatures. For dilute solutions, 5 to 6 per cent, the most favourable temperature should not exceed 17 to 18° C., and for concentration below 5 per cent the temperature should be kept still lower.

The citric acid remaining in the mother liquor from which the acid citrate has been separated can be recovered as neutral citrate following the usual procedure.

I claim:—

1. An improved process for the manufacture of acid calcium citrate from a citric acid solution, consisting in first adding to the solution about one-half the amount of a member of the group consisting of lime and calcium carbonate necessary for the complete neutralization of the acid present, precipitating the acid citrate created, and then adding a further quantity of the lime or calcium carbonate sufficient to bring the total up to two-thirds of that necessary to effect complete neutralization of the acid originally present whereby a second precipitation of acid calcium citrate is brought about.

2. An improved process for the manufacture of acid calcium citrate according to claim 1, characterized by the fact that the operations are conducted at a temperature not exceeding 20° C.

3. The process for the manufacture of acid calcium citrate which consists in first adding to a solution of citric acid a member of the group consisting of lime and calcium carbonate in an amount corresponding to a substantial portion of that necessary to convert all of the acid to acid citrate, precipitating the acid citrate formed, and then adding the remaining amount of said lime or calcium carbonate necessary to convert the remaining acid to acid citrate.

4. The process for the manufacture of acid calcium citrate which consists in adding successive amounts of a member of the group consisting of lime and calcium carbonate to a solution of citric acid and precipitating the acid citrate after each addition, each addition of lime or calcium carbonate constituting a substantial proportion of the total employed and said total comprising substantially two-thirds of the amount necessary for complete neutralization of the acid in the solution.

ALEXANDER HUTCHEON BENNETT.